Oct. 15, 1929.                W. E. TRUMPLER                 1,731,880
                    TORSION DEVICE FOR BALANCING MACHINES
                         Filed May 15, 1926         2 Sheets-Sheet 1
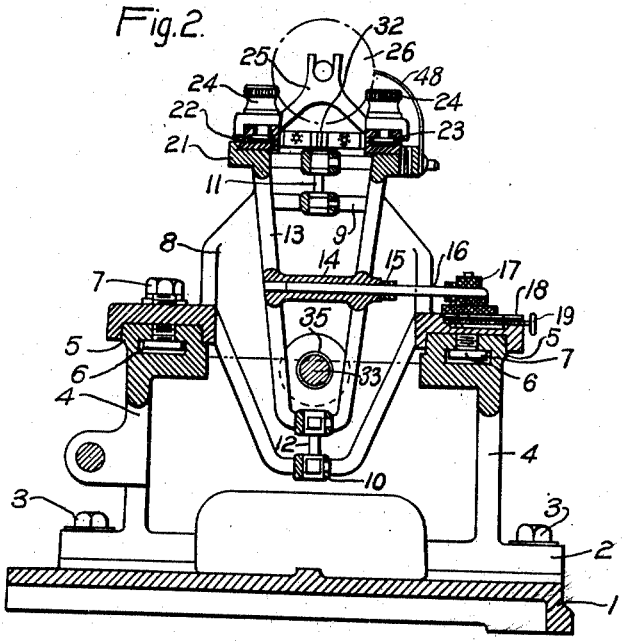
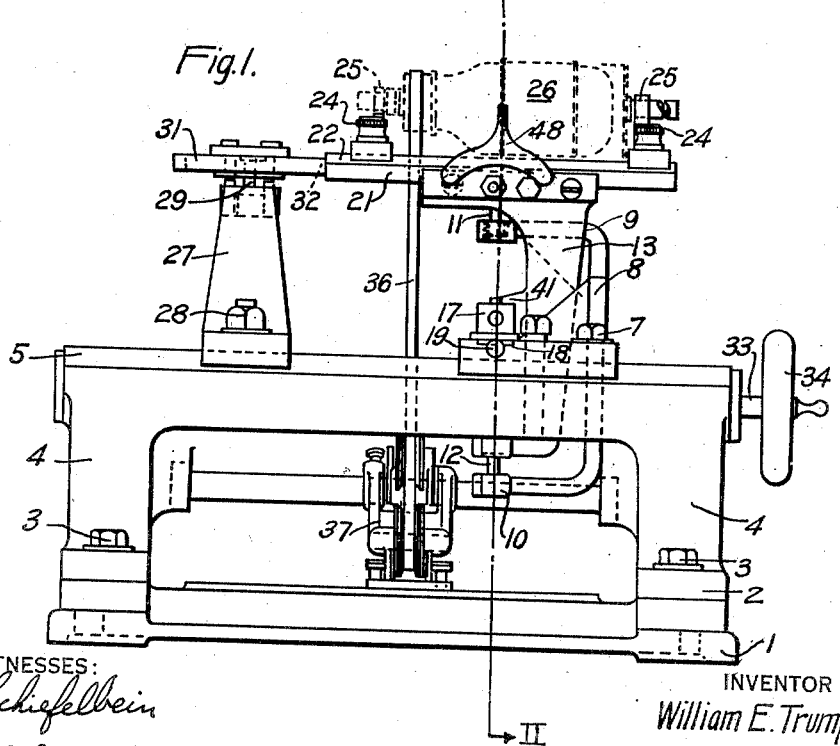
WITNESSES:
INVENTOR
William E. Trumpler.
BY
ATTORNEY Patented Oct. 15, 1929

1,731,880

UNITED STATES PATENT OFFICE

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA

TORSION DEVICE FOR BALANCING MACHINES

Application filed May 15, 1926. Serial No. 109,272.

My invention relates to balancing machines for testing the dynamic unbalance of rotors and particularly to spring systems therefor.

An object of my invention is to provide an adjustable spring system for balancing machines that is capable of gradually varying the natural period of vibration of the bed member.

Another object of my invention is to provide means for tuning the vibrating system of a balancing machine to the driving motor speed while the machine is in operation.

Heretofore, balancing machines have been built with spring systems designed to provide a fixed frequency of vibration of the balancing bed for a given mass of the oscillating system. However, as the mass of the oscillating system depends upon the weight of the body being balanced, the result has been that the natural period of vibration or critical speed of the balancing system was different for rotors of different weights.

As it is desirable to operate the machine at the critical speed, that is, the speed of rotation corresponding to the natural frequency of the vibrating system, the speed of the driving motor was varied to bring it to the critical speed corresponding to the weight of each different rotor that was tested. This arrangement necessitated complicated and expensive electrical or other frequency or speed-changing equipment.

My present invention provides an oscillating system comprising a spring member of adjustable resilient characteristics or ratio of deflection to applied force that may be varied while the balancing machine is in operation to tune or change the natural period of vibration of the balancing system to the speed corresponding to the speed of the driving motor.

By using my adjustable spring system, it becomes possible to drive the balancing machine at a convenient uniform speed by means of a constant speed motor or similar constant speed driving unit, and to make that speed the critical speed by tuning the vibrating system to resonance with it. The tuning operation may be performed with my device without stopping the machine or disturbing the vibrations of the system in any way and a gradual adjustment may be made over a wide range of frequencies.

In the accompanying drawings, Fig. 1 is an elevational view of a balancing machine having an adjustable spring system embodying my invention;

Fig. 2 is a view in cross-section taken along the line II—II in Fig. 1, and

Figure 3:
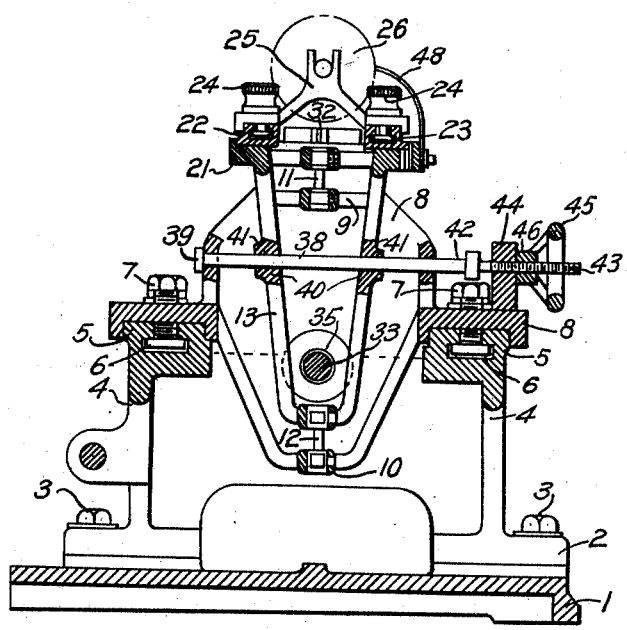
Fig. 3 is a view in cross-section of a balancing machine embodying a modification of my adjustable spring system.

Referring to the drawings, the balancing machine embodying my invention comprises a base 1 and a bed plate 2 that is secured thereto by a plurality of bolts 3. The bed plate has projecting side portions 4 that are provided with ways 5 and T-slots 6, the latter being adapted to receive square head bolts 7 for securing a fulcrum support 8. The fulcrum support 8 is provided with projecting portions 9 and 10 which are adapted to receive a plurality of torsional spring pivots 11 and 12. The spring pivots 11 and 12, respectively engage portions of an oscillatory supporting member 13.

A bracket 14 is provided on the supporting member 13 for slidably receiving one end of a beam spring 15. The beam spring 15 is provided with a restricted portion 16 for localizing the deflection therein. The other end of the spring 15 is secured to a slide 17 that is so mounted in a slot 18 in the fulcrum support 8 that it may be moved toward or away from the center of the spring support 13 thereby varying the radius at which the restricted portion 16 of the spring 15 acts upon the spring support 13. This radial adjustment is secured by means of an adjusting screw 19.

The upper portion of the member 13 is provided with dove-tailed ways 21 for receiving correspondingly shaped side portions of the bed member 22. T-slots 23 are provided in the bed member 22 for receiving thumb screws 24 that secure a pair of journal pedestals 25 that are adapted to journal a rotor 26 to be balanced. A pedestal 27 is secured to the ways 5 of the bed member by bolts 28 and a torsional spring member 29 having an adjustable spring arm 31 is secured in the upper portion of the pedestal 27. The extended end of the spring arm 31 is secured by flat-leaf spring members 32 to the bed 22, preferably at its center of gravity. The function of the spring member 32 is to retain the bed member 22 in fixed longitudinal relation with the base 2.

The fulcrum support 8 is adapted to be moved on the ways 5 and may be secured in any desired position for performing the testing operation by means of the bolts 7. A threaded spindle 33 having a hand-wheel 34 engages an internal screw thread 35 on the fulcrum support 8 to adjust its position relative to the base 2 and the bed member 22. A belt 36 is provided for connecting the rotor 26 with a driving mechanism 37.

Referring to Fig. 3, the adjustable spring system embodying my invention may be made in the form of a flexible strap 38 that is secured at one end 39 to the fulcrum support 8 and passes through openings 40 in the brackets 41 on the spring support 13. The other end 42 of the strap 38 is secured to a threaded rod 43 that passes through a bracket 44 mounted on the fulcrum support 8. A hand-wheel 45, having an internally threaded portion 46 for engaging the threaded rod 43, bears against the bracket 44 for the purpose of adjusting the tension in the spring member 38.

The operation of this device is briefly as follows. The fulcrum support 8 is adjusted by means of the hand-wheel 34 to a position directly under one balancing plane 47 of the rotor 26, as indicated by a pointer 48, and secured in position by the bolts 7. The rotor is then actuated by means of the belt 36 and any lack of balance observed by noting the oscillation of the bed member 22. By adjusting the variable spring system embodying my invention to correspond to the mass of the rotor being tested, the vibrating system may be tuned to the speed of rotation of the rotor 26 to provide the maximum amplitude of oscillation of the bed member 22 for a given unbalanced mass in the rotor 26. This adjustment may be made while the rotor is in motion without disturbing the operation of the machine in any way.

In the spring system illustrated in Fig. 2, this adjustment is accomplished by moving the slide 17 toward or away from the spring support 13, thereby varying the lever arm by which the restricted portion 16 of the spring 15 acts upon the spring support 13 and thus varying the total spring constant of the vibrating system.

The variation of the spring constant may be accomplished in a somewhat different way by the device illustrated in Fig. 3. In this modification of my spring system, the resilient characteristic of the spring strap 38 is varied by regulating the tension therein by means of the hand-wheel 45.

It is evident from the foregoing description of my invention that a balancing machine in accordance therewith provides a simple and rugged adjustable spring system that is adapted to tune the vibrating system to resonance with the speed of the rotor being balanced and to accomplish this tuning gradually over a wide range of frequencies. This device makes it possible to operate a balancing machine at a fixed speed and to compensate for the changes in the natural frequency of the vibrating system that result from balancing rotors of different sizes by adjusting the spring constant of the system.

Although I have described a specific embodiment of my invention, it will be obvious to those skilled in the art that various modifications may be made in the details of construction of the various parts without departing from the spirit and scope of my invention, as set forth in the appended claims.

I claim as my invention:

1. A spring system for balancing machines that comprises a plurality of torsion spring members, a beam spring member and supports for the beam spring having means for adjusting the effective length of the beam-spring member.

2. The combination with an oscillating system for a balancing machine, of an adjustable spring member comprising a beam spring of adjustable effective length for varying the natural period of vibration of the oscillating system.

3. A balancing machine comprising a base, a fulcrum support movably mounted thereon, flexible fulcrum members secured to said fulcrum support, an oscillatable supporting member secured to said flexible fulcrum members, an oscillatable bed movably supported on said supporting member and a spring member of adjustable resilient characteristics secured to said oscillatable supporting member and to the fulcrum support.

4. A balancing machine comprising a base, a fulcrum support movably mounted thereon, a plurality of torsionally flexing spring fulcrums secured to said support, a spring support secured thereto, an oscillatable bed movably mounted on said spring support, a spring member having an adjustable ratio of force to deflection secured to the fulcrum support and to the spring support, and means for moving the fulcrum support and spring support relative to the base and oscillatable bed.

5. In an oscillating system for balancing machines, a pivotally mounted bed member, a spring system for supporting the bed member comprising a plurality of springs each having invariable characteristics and a movable spring member for adjusting the system to change the natural period of oscillation thereof.

6. A spring system for balancing machines that comprises a plurality of torsion spring members each spring member having constant characteristics and a spring member disposed to be moved radially relative to the axes of the torsion spring to adjust the characteristics of the spring system.

In testimony whereof, I have hereunto subscribed my name this 30th day of March, 1926.

WILLIAM E. TRUMPLER.